(12) United States Patent
Ho et al.

(10) Patent No.: US 8,691,100 B2
(45) Date of Patent: Apr. 8, 2014

(54) CONCAVE AND CONVEX MICROMIRRORS AND METHODS OF MAKING THE SAME

(75) Inventors: Dah-Chuen Ho, Jhubei (TW); Eugene Chu, Hsin-chu hsien (TW); Yuh-Haw Chang, Shulin (TW); Fei-Yun Chen, Hsinchu (TW); Michael Wu, Kaohsiung (TW); Eric Chao, Bali Township, Taipei County (TW)

(73) Assignee: Taiwan Semiconductor Manufacturing Co. Ltd., Hsin-Chu (TW)

( * ) Notice: Subject to any disclaimer, the term of this patent is extended or adjusted under 35 U.S.C. 154(b) by 1784 days.

(21) Appl. No.: 11/450,236

(22) Filed: Jun. 9, 2006

(65) Prior Publication Data

US 2007/0285760 A1  Dec. 13, 2007

(51) Int. Cl.
*B29D 11/00* (2006.01)
*G02B 26/00* (2006.01)

(52) U.S. Cl.
USPC .............. 216/24; 216/11; 216/26; 216/67; 359/290; 359/291; 359/578

(58) Field of Classification Search
USPC .............. 438/700, 702, 717, 723, 724, 725; 216/11, 26, 67, 74, 79, 24; 359/290, 359/291, 578
See application file for complete search history.

(56) References Cited

U.S. PATENT DOCUMENTS

| | | | |
|---|---|---|---|
| 6,424,466 B1 * | 7/2002 | Flanders | 359/578 |
| 6,498,666 B1 * | 12/2002 | Asghari | 398/139 |
| 2002/0024641 A1 * | 2/2002 | Ilkov et al. | 353/99 |
| 2002/0126726 A1 * | 9/2002 | Flanders et al. | 372/107 |

* cited by examiner

*Primary Examiner* — Nadine Norton
*Assistant Examiner* — Mahmoud Dahimene
(74) *Attorney, Agent, or Firm* — Tung & Associates

(57) ABSTRACT

A method comprising providing a first substrate and forming a first sacrificial layer over the first substrate, the first sacrificial layer comprising a curved surface portion, and forming a curved micromirror by depositing a reflective material over at the curved surface portion.

10 Claims, 4 Drawing Sheets

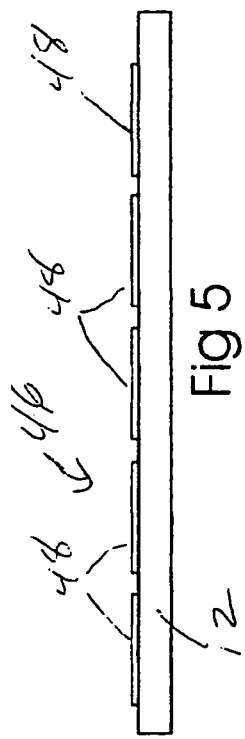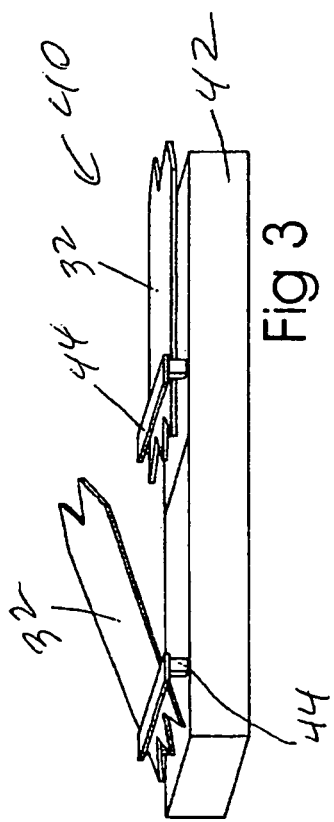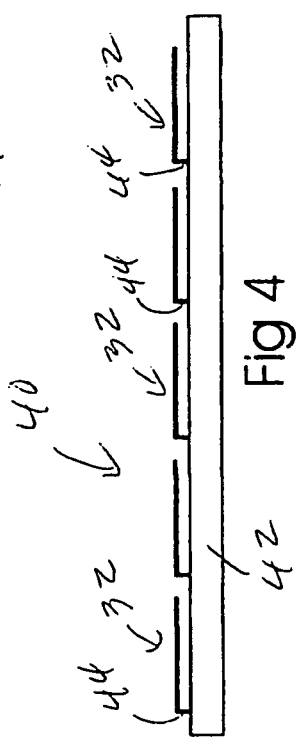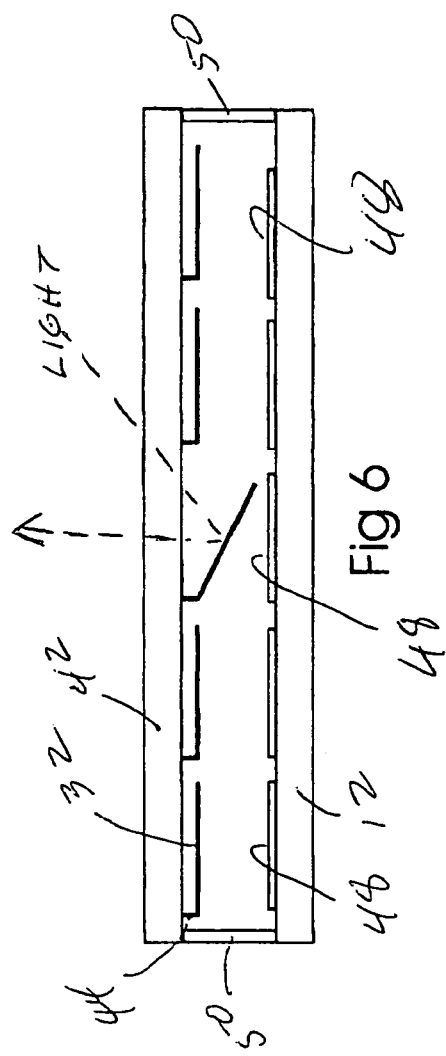

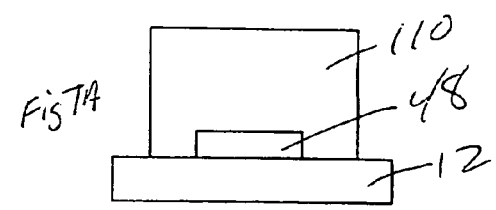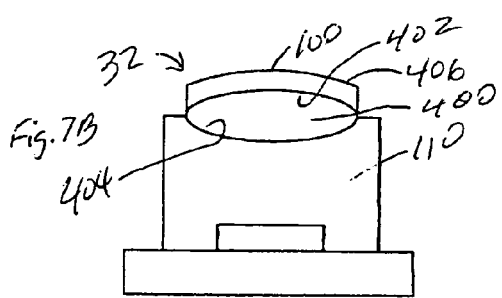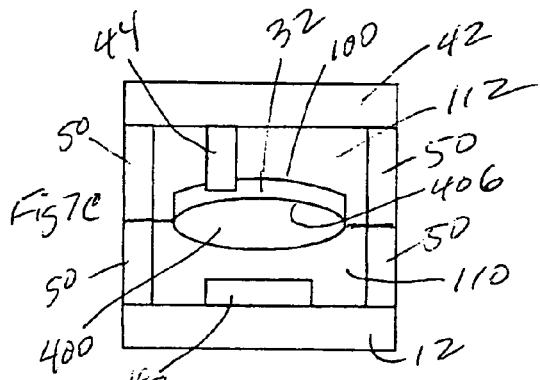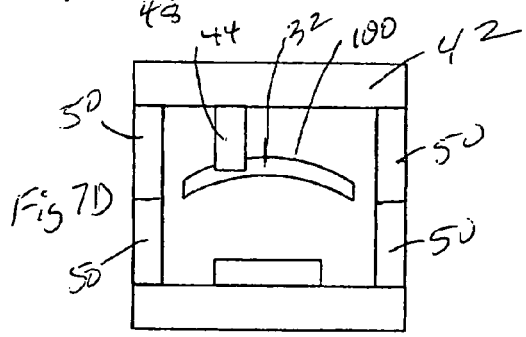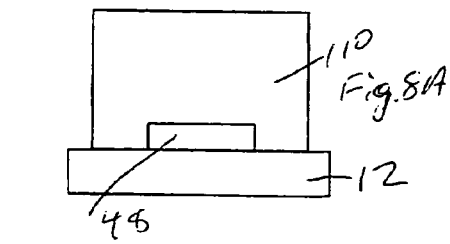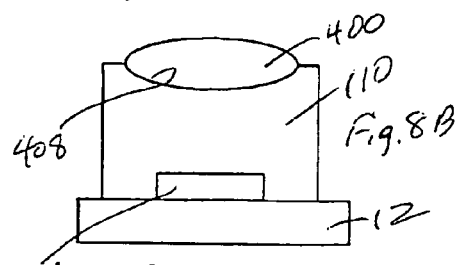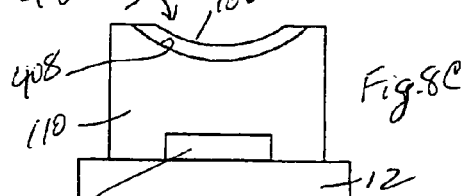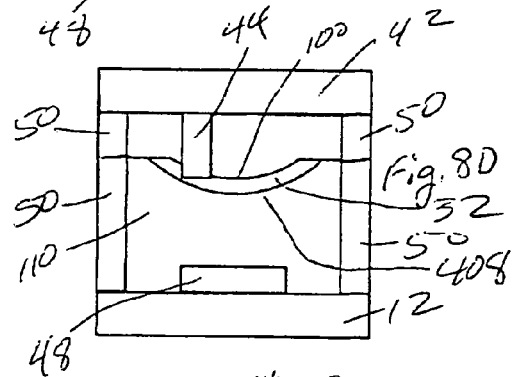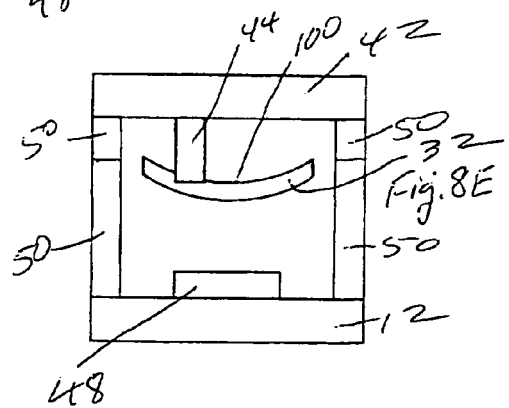

CONCAVE AND CONVEX MICROMIRRORS AND METHODS OF MAKING THE SAME

FIELD OF THE INVENTION

This invention relates to micromirrors, methods of making the same and products using the same, and more particularly to micromirrors, digital micromirror devices, projection systems and methods of making the same.

BACKGROUND OF THE INVENTION

New advancements in projection systems utilize an optical semiconductor known as a digital micromirror device. A digital micrometer device chip may be the world's most sophisticated light switch. It contains an array from 750,000 to 1.3 million pivotally mounted microscopic mirrors. Each mirror many measure less than ⅕ of the width of a human hair and corresponds to one pixel in a projected image. The digital micromirror device chip can be combined with a digital video or graphic signal, a light source, and a projector lens so that the micromirrors reflect an all-digital image onto a screen or onto another surface.

Although there are variety of digital micromirror device configurations, typically micromirror are mounted on tiny hinges that enable each mirror to be tilted either toward the light source (on) in a projector system to reflect the light or away from the light source (off) creating a darker pixel on the projection surface. A bitstream of image code entering the semiconductor directs each mirror to switch on or off several times per second. When the mirror is switched on more frequently than off the mirror reflects a light gray pixel. When the mirror is switched off more frequently than on the mirror reflects a darker gray pixel. Some projection systems can deflect pixels enough to generate 1024 shades of gray to convert the video or graphic signal entering the digital micromirror device into a highly detailed grayscale image. In some systems, light generated by a lamp passes through a color wheel as it travels to the surface of the digital micromirror device panel. The color wheel filters to light into red, green and blue. A single chip digital micromirror vice projector systems can create at least 16.7 million colors. When a prism is used to divide a light source into red, green and blue light and three digital micromirror device chips are utilized, more than 35 trillion colors can be produced. The on and off states of each micromirror are coordinated with the three basic building blocks of color: red, green and blue to produce a wide variety of colors.

A variety of digital micromirror devices (DMD) are known. FIG. 1 illustrates one embodiment of a prior art DMD that may be used in the present invention with the substitution of a unique mirror structure according to the present invention. As shown in FIG. 1, a DMD 10 may include a semiconductor device 12 such as a CMOS memory device that includes circuitry 13 that is used to activate an electrode(s) in response to a video or graphic signal. A first layer 14 is formed over the semiconductor device 12 and may include a yoke address electrode 16, and vias 18 formed therein down to the circuitry 13 on the semiconductor device 12, and a bias-reset bus 20. A second layer 22 is formed over the first layer 14 and may include a yoke 24 torsion hinge 26 and mirror address electrodes 28. A micromirror 32 is formed over the second layer 22 and positioned so that the micromirror 32 may be deflected diagonally when one of the electrodes 28 is activate by the semiconductor device 12. The micromirror 32 includes a reflective layer typically including aluminum. The DMD 10 shown in FIG. 1 while being an excellent engineering accomplishment is very complex, costly to manufacture and has low manufacturing yield.

FIG. 2 illustrates a prior art projector system 300 that includes an array of micromirrors 302, typically formed on a semiconductor chip. The array of micromirror 302 may be attached to a printed circuit board 304 or similar substrate that include additional microelectronic devices 306, 308 to perform video processing of video or graphic signal and scaling of the image to be projected. A bright light source 310 is provided and a first optical lens 312 may be present and positioned to direct light from the source 310 through a color wheel 314. The color wheel 314 includes transparent sections with different color filters such as red, green and blue filters. Additional color filters and clear sections may be provided on the color wheel 314. Light emitted from (or passing through) the color wheel 314 may be focused by a second optic lens 316 onto the array of micromirrors 302 so that each micromirror is operated to selectively reflect (or not) the light projected thereon. Light reflected from the array of micromirrors 302 may be focus by a third optic lens 318 onto a wall or screen 320.

A variety of different micromirror configurations are known to provide pivotal movement of the micromirrors. Huibers et al U.S. Pat. No. 6,396,619 discloses a deflectable spatial light modulator including a mirror plate that is substantially ridge and may be made up of a laminate having layers of silicon nitride and aluminum. In one embodiment, the mirror laminate may include a layer of aluminum sandwiched by two layers of silicon nitride. In other embodiments, include only a layer of aluminum and a layer of silicon nitride is provided. Multi-layer arrangements with multiple layers of aluminum and/or silicon nitride are disclosed. The reference states that other materials besides aluminum (such as conductive and reflective metals) could be used. Other materials besides silicon nitride, such as silicon dioxide are also disclosed. The reference discloses that the silicon nitride layer may be 1400 A thick and that the aluminum layer may be 700 A thick. Disclosed also is one or more dielectric films, that act as a reflective coating, may be deposited on the mirror laminate to improve reflectivity.

The present invention provides alternatives to and improvements over the micromirror, DMD and projection systems of the prior art.

SUMMARY OF THE INVENTION

A method comprising providing a first substrate and forming a first sacrificial layer over the first substrate, the first sacrificial layer comprising a curved surface portion, and forming a curved micromirror by depositing a reflective material over at the curved surface portion.

A product comprising a micromirror assembly comprising a micromirror comprising a reflective layer comprising a first face for reflecting light and an opposite back face, the first face having one of a generally convex shape and a generally concave shape These and other embodiments of the present invention will become apparent from the following brief description of the drawings, detailed description of the preferred embodiments, and appended claims and drawings.

BRIEF DESCRIPTION OF THE DRAWINGS

FIG. 3 illustrates one embodiment of an alternative micromirror subassembly useful in the present invention.

FIG. 4 illustrates one embodiment of an alternative micromirror subassembly useful in the present invention.

FIG. 5 illustrates one embodiment of an alternative micromirror subassembly useful in the present invention.

FIG. 6 illustrates one embodiment of an alternative micromirror assembly useful in the present invention.

FIG. 7A illustrates one embodiment of the invention including a method of providing a first sacrificial layer over a substrate.

FIG. 7B illustrates one embodiment of the invention including a method including forming a second sacrificial layer over the first sacrificial layer, and wherein the second sacrificial layer has an upper surface that is substantially convex in shape.

FIG. 7C illustrates one embodiment of the invention including a method including forming a micromirror over the second sacrificial layer so that the micromirror has a reflective surface that is substantially convex in shape, and wherein the micromirror is hinged to a transparent layer.

FIG. 7D illustrates one embodiment of the invention including a method including removing the first, second and third sacrificial layers to provide a pivotally moveable micromirror with a convex reflective surface.

FIG. 8A illustrates one embodiment of the invention including a method of providing a first sacrificial layer over a first substrate.

FIG. 8B illustrates one embodiment of the invention including a method including growing a second sacrificial layer over the first sacrificial layer, and wherein the first sacrificial layer has a concave shaped upper surface at the interface of the first and second sacrificial layers.

FIG. 8C illustrates one embodiment of the invention including a method including removing the second sacrificial layer and forming a micromirror over the concave upper surface of the first sacrificial layer.

FIG. 8D illustrates one embodiment of the invention including a method including forming a third sacrificial layer over the second sacrificial layer and reflective layer, forming a transparent layer and a hinge connecting the micromirror to the transparent layer.

FIG. 8E illustrates one embodiment of the invention including a method including removing the first and third sacrificial layers to provide a pivotally moveable micromirror.

DETAILED DESCRIPTION OF EXEMPLARY EMBODIMENTS

Figure 1:
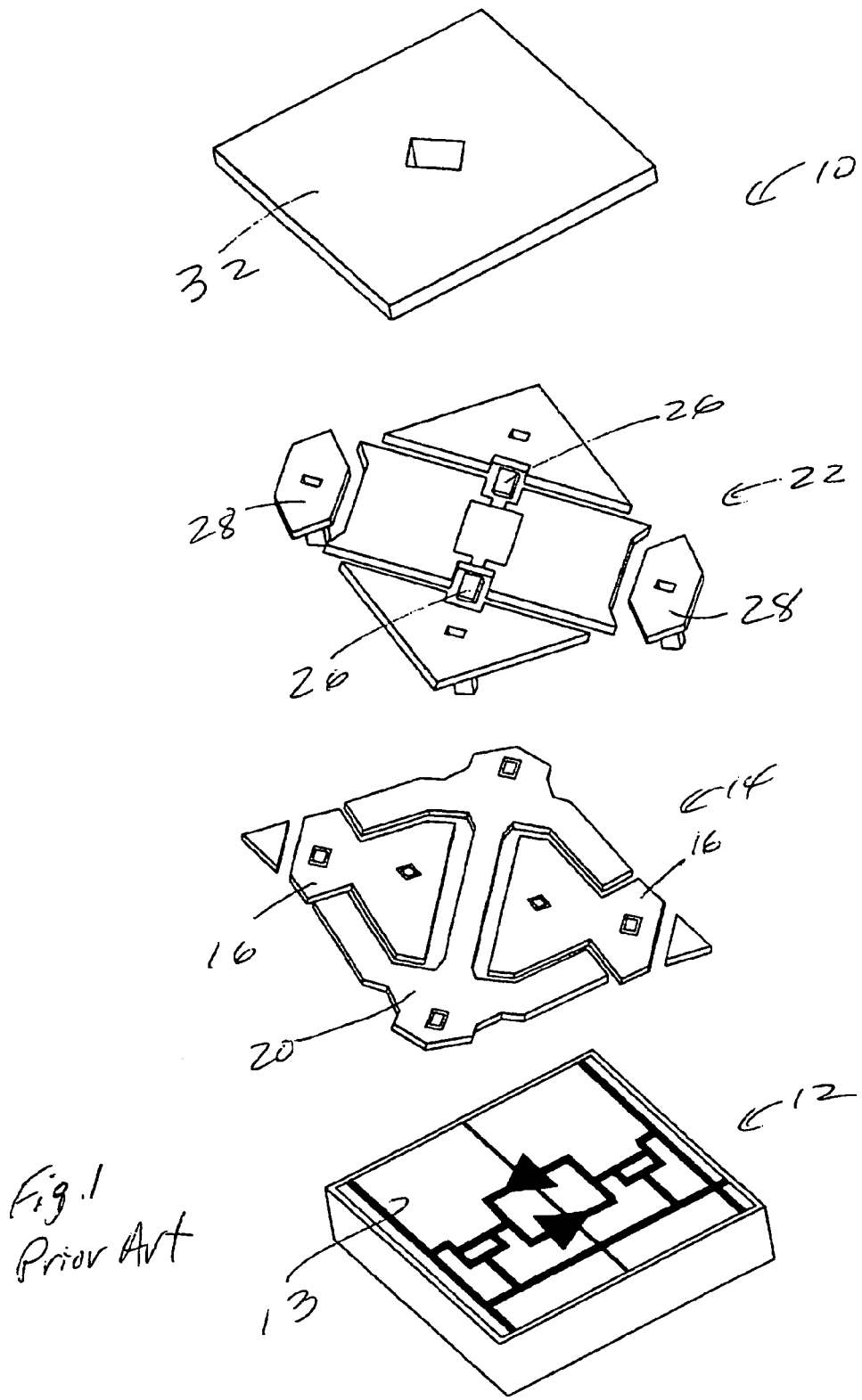
FIG. 1 illustrates a prior art micromirror assembly.
Figure 2:
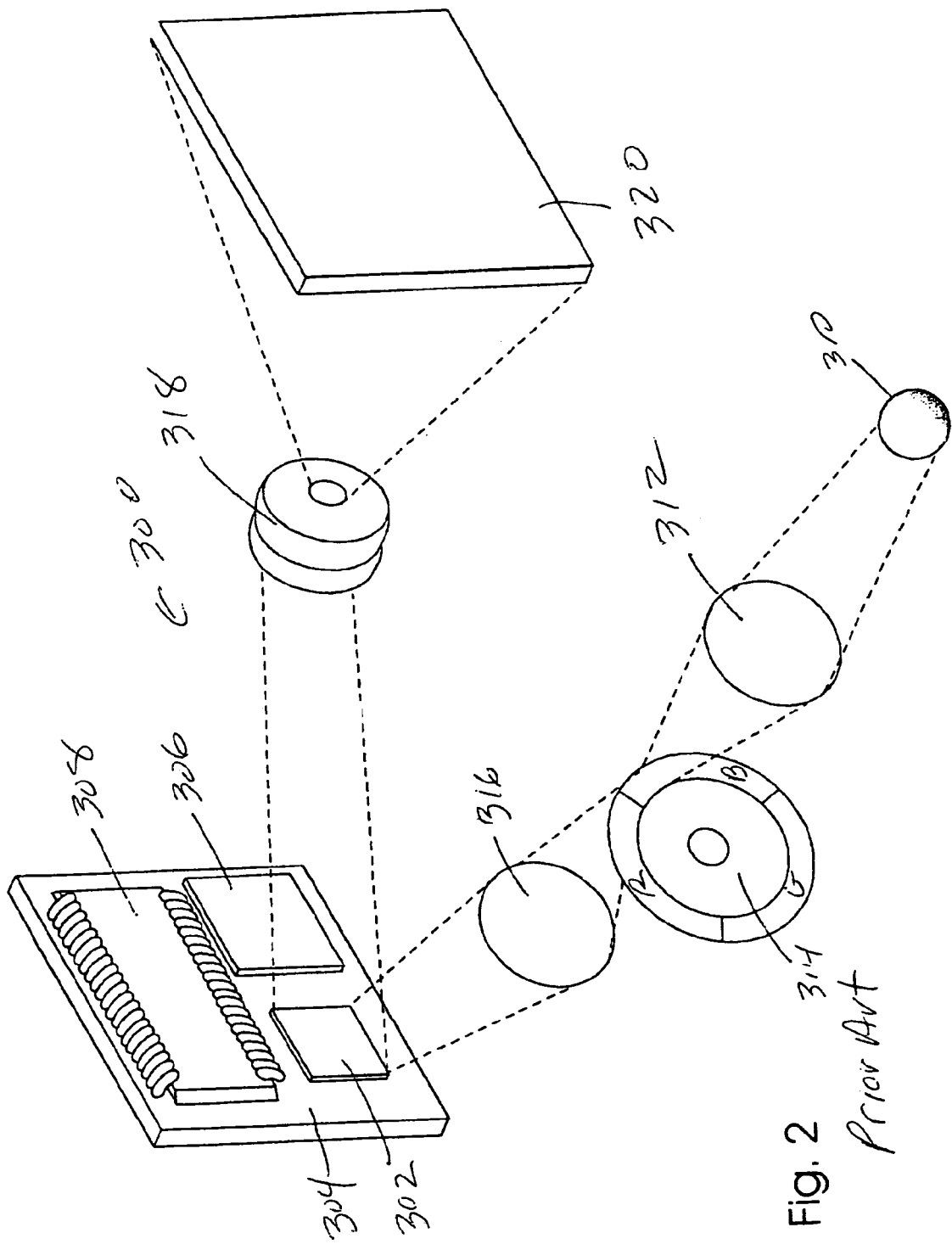
FIG. 2 illustrates a prior art projector system.

FIG. 3 illustrates a first subassembly 40 for a second type of DMD. The subassembly 40 may include a transparent layer 42 that may be any transparent material including, but not limited to, glass. A hinge 44 is formed on the transparent layer 44 and a micromirror 32 is secured thereto for pivotal movement with respect to the hinge 44 and the transparent layer 42.

FIG. 4 illustrates the first subassembly 40 including a plurality of micromirrors 32 each connected by a hinge 44 to the transparent layer 42. All of the component and subassemblies of the various DMD devices can be made by semiconductor or MEM micro processing techniques known to those skilled in the art.

FIG. 5 illustrates a second subassembly 46 of the second type of DMD and may include a semiconductor device 12 such as, but not limited to, a CMOS memory device. A plurality of electrodes 48, one for each micromirror 32 are formed over the semiconductor device 12 for communication with the circuitry (not shown) contained therein so that the electrode 48 may be selectively activated in response to a video or graphic signal.

FIG. 6 illustrates a DMD structure 10 that may be utilized by the present invention with the substitution of a unique micromirror according to the present invention. The DMD of FIG. 6 includes the first subassembly 40 flipped over and overlying the second subassembly 46 so the micromirrors 32 of the first subassembly 40 face and are closest to the electrodes 48 of the second subassembly 46. Post 50 are provided and positioned so that the micromirrors 32 are spaced a distance from the electrodes 48 and so that micromirror 32 is free to be defected or pivotally moved by the activation of an associated electrode 48. The first and second subassemblies 40 and 46 may be formed from a single silicon substrate with additional deposited on top and a sacrificial layer(s) remove to provide the space between the micromirrors 32 and the electrode 40. As illustrated in FIG. 5, when light is director on to the micromirrors 32, an electrode 48 associated with for each micromirror 32 may be activated causing the micromirror to pivotally move about the hinge 44. As a result, the light will be reflected or not depending on whether the electrode 48 associated with the micromirror 32 has been activated or not. As described above, depending on how fast and often a particular micromirror 32 is deflected by the electrode 48, the image projected by the micromirror 32 (pixel) will appear light or dark on the projection screen or other surface. The micromirror 32 shown in FIGS. 3-6 is flat. A micromirror according to the present invention, including concave and convex micromirrors, may be substituted for the flat micromirrors in the subassemblies 40 and 46 of FIGS. 3-6.

FIG. 7A illustrates one embodiment of the invention including forming a first sacrificial layer 10 over a first substrate 12. The first substrate 12 may be a semiconductor wafer, ceramic, plastic, fiberglass board, flexible board, or any other substrate useful in making microelectronic devices known to those skilled in the art. An electrode 48 may be provided on the first substrate 12. FIG. 7B illustrates another embodiment of the invention, including forming a second sacrificial layer 400 over the first sacrificial layer 110. The second sacrificial layer 400 has an upper surface 406 that is substantially convex in shape. In one embodiment, the first sacrificial layer 110 includes silicon, for example amorphous silicon, and the second sacrificial layer 400 is formed by growing field oxide from the amorphous silicon. The field oxide may be grown by exposing the amorphous silicon to oxygen in the form of dry oxygen gas, or steam. Field oxide growth is a well known process that is very controllable. The process parameters for growing the field oxide may be controlled to ensure that the upper surface 406 is substantially convex in shape. However, it is not necessary for the profile of the upper surface 406 to be symmetrical to be within the scope of the invention. Thereafter a micromirror 32 may be formed over the upper surface 406 of the field oxide 400. The micromirror 32 may be a laminate of several layers including a reflective layer 100 that has a reflective surface (upper surface) that is substantially convex in shape. As shown in FIG. 7C, a third sacrificial layer 112, such as amorphous silicon, may be formed over the second sacrificial layer 400 and the micromirror 32. Post 50 may be provided in the first and second sacrificial layers 110, 112. A transparent layer 42, such a glass, may be formed over the third sacrificial layer 112. A hinge 44 may be provided pivotally connecting the micromirror 32 to the transparent layer 42. Of course, the hinge 44 may be formed to pivotally connect the micromirror 32 to the first substrate 12. As shown in FIG. 7D, the first, second and third sacrificial layers may be removed to provide a micromirror 32 with a convex reflective surface pivotally connected to one of the transparent layer 42 or the first substrate 12. The amorphous silicon may be removed, for example, by etching with XeF2 gas, and the field oxide (silicon dioxide) may be removed by etching with CHF3/O2 gas mixture.

The curved micromirror 32 may be a laminate of several layers including a reflective layer that includes a light reflecting material such as, but not limited to, at least one of aluminum or silver. In one embodiment, the reflective layer may be 2000-4000 A (angstroms) thick, and preferably 2400-3000 A thick, and most preferably 2500 A thick. In one embodiment, the reflective layer includes aluminum, silicon and copper. In another embodiment, the reflective layer includes 98.5 weight percent aluminum, 1 weight percent silicon and 0.5 weight percent copper. The reflective layer may be formed by any method known to those skilled in the art, including screen printing, chemical vapor deposition, by securing a foil to a first protective layer (such as silicon nitride), but preferably is formed by sputtering a reflective material onto the first protective layer or onto another surface from which the reflective layer 100 can be removed.

As shown in FIG. 8A, another embodiment of the invention including forming a first sacrificial layer 110 over a first substrate 12. Again, the first substrate 12 may be a semiconductor wafer, ceramic, plastic, fiberglass board, flexible board, or any other substrate useful in making microelectronic devices known to those skilled in the art. An electrode 48 may be provided on the first substrate 12. FIG. 8B illustrates another embodiment of the invention including forming a second sacrificial layer 400 over the first sacrificial layer 110. In one embodiment, the first sacrificial layer 110 includes silicon, for example amorphous silicon, and the second sacrificial layer 400 is formed by growing field oxide from the amorphous silicon. The field oxide may be grown by exposing the amorphous silicon to oxygen in the form of dry oxygen gas, or steam. Field oxide growth is a well known process that is very controllable. The growth of the field oxide consumes a portion of the underlying silicon providing a silicon/field oxide interface. The process parameters for growing the field oxide may be controlled to ensure that the upper surface 408 of the first sacrificial layer 110, at the silicon/field oxide interface, is substantially concave in shape. However, it is not necessary for the profile of the upper surface 408 to be symmetrical to be within the scope of the invention. Thereafter, as shown in FIG. 8C, the second sacrificial layer 400 is removed and a micromirror 32 may be formed over the upper substantially concave surface 408 of the first sacrificial layer 110. The micromirror 32 may be a laminate of several layers including a reflective layer 100 (upper surface) that has a reflective surface that is substantially convex in shape. As shown in FIG. 8D, a third sacrificial layer 112, such as amorphous silicon, may be formed over the first sacrificial layer 110 and the micromirror 32. Post 50 may be provided in the first and second sacrificial layers 110, 112. A transparent layer 42, such a glass, may be formed over the third sacrificial layer 112. A hinge 44 may be provided pivotally connecting the micromirror 32 to the transparent layer 42. Of course, optionally the hinge may be formed to pivotally connect the micromirror 32 to the first substrate 12. As shown in FIG. 8E, the first and third sacrificial layers may be removed to provide a micromirror with a convex reflective surface pivotally connected to one of the transparent layer 42 or the first substrate 12. Again, the amorphous silicon may be removed by, for example etching with XeF2 gas and the field oxide (silicon dioxide) may be removed by etching with CHF3/O2 gas mixture.

When the terms "overlying", "overlie", "over" and the like terms are used herein regarding the position of one component of the invention with respect to another component of the invention, such shall mean that the first component may be in direct contact with the second component or that additional components such as under bump metallurgies, seed layers and the like may be interposed between the first component and the second component.

What is claimed is:

1. A method comprising:
   providing a substrate and forming a first sacrificial layer comprising amorphous silicon over the substrate,
   forming a second sacrificial layer comprising silicon oxide over the first sacrificial layer, wherein at least one of the first and second sacrificial layers comprises a curved surface portion, and
   forming a curved micromirror by depositing a reflective material over the curved surface portion; and
   depositing a third sacrificial layer over the second sacrificial layer and the reflective layer, and depositing a transparent layer over the third sacrificial layer and providing a hinge connected to the micromirror and to one of the first substrate and the transparent layer.

2. A method as set forth in claim 1 wherein the first sacrificial layer comprises silicon and wherein the forming of a second sacrificial layer comprises growing field oxide from the first sacrificial layer.

3. A method as set forth in claim 1 wherein the first sacrificial layer comprises silicon and wherein the forming of a second sacrificial layer comprises growing field oxide from the first sacrificial layer, and the curved surface is the upper surface of the silicon at the interface of the silicon and the field oxide, and further comprising removing the field oxide, and wherein the reflective layer is deposited on the upper surface of the silicon.

4. A method as set forth in claim 3 further comprising depositing a third sacrificial layer over the second sacrificial layer and the reflective layer, and depositing a transparent layer over the third sacrificial layer and providing a hinge connected to the micromirror and to the transparent layer, and removing the first and second sacrificial layers to provide a micromirror pivotally connected to the transparent layer.

5. A method as set forth in claim 3 wherein the micromirror has a reflective surface that has a substantially concave shape.

6. A method as set forth in claim 3 wherein the micromirror has a reflective surface that has a substantially convex shape.

7. A method as set forth in claim 3 wherein the first sacrificial layer comprises silicon and wherein the forming of the second sacrificial layer comprises growing field oxide from the first sacrificial layer, and the curved surface is the upper surface of the field oxide and wherein the reflective layer is deposited on the upper surface of the field oxide.

8. A method as set forth in claim 7 further comprising depositing a third sacrificial layer over the second sacrificial layer and the reflective layer, and depositing a transparent layer over the third sacrificial layer and providing a hinge connected to the micromirror and one of the first substrate and the transparent layer.

9. A method as set forth in claim 7 further comprising depositing a third sacrificial layer over the second sacrificial layer and the reflective layer, and depositing a transparent layer over the third sacrificial layer and providing a hinge connected to the micromirror and to the transparent layer, and removing the first and second sacrificial layers to provide a micromirror pivotally connected to the transparent layer.

10. A method comprising:
    providing a substrate with at least one electrode thereon, forming a layer comprising amorphous silicon over the substrate and the at least one electrode, growing field oxide from the layer comprising amorphous silicon, wherein the growing of the field oxide consumes a portion of the layer comprising amorphous silicon to provide a silicon-field oxide interface, wherein the growth of the field oxide is controlled so that the upper surface of the field oxide is substantially convex in shape, the upper surface of the layer comprising amorphous silicon at the silicon-field oxide interface is substantially concave in shape, forming a curved micromirror by removing the field oxide and depositing a reflective layer over the substantially concave surface of the layer comprising amorphous silicon; or depositing a reflective layer over the substantially convex surface of the field oxide.

* * * * *